INVENTOR.
ROELOF MAARTEN MARIE OBERMAN.
BY Hugh A. Kirk
Attorney.

Nov. 11, 1958 R. M. M. OBERMAN 2,860,189

AUTOMATIC SWITCHING SYSTEM WITH REDUCED INTERNAL BLOCKING

Filed Aug. 26, 1954 4 Sheets-Sheet 2

INVENTOR.
ROELOF MAARTEN MARIE OBERMAN
BY Hugh A. Kirk
Attorney.

INVENTOR.
ROELOF MAARTEN MARIE OBERMAN
BY Hugh A. Kirk
Attorney

INVENTOR.
ROELOF MAARTEN MARIE OBERMAN
BY Hugh A. Kirk
Attorney.

United States Patent Office 2,860,189 Patented Nov. 11, 1958

2,860,189

AUTOMATIC SWITCHING SYSTEM WITH REDUCED INTERNAL BLOCKING

Roelof M. M. Oberman, Voorburg, Netherlands, assignor to Staatsbedrijf der Posterijen, Telegraphie en Telefonie, The Hague, Netherlands Application August 26, 1954, Serial No. 452,421

Claims priority, application Netherlands August 27, 1953

17 Claims. (Cl. 179—18)

The invention relates to a control equipment for an automatic telecommunication system. More particularly, it deals with an automatic telegraph or telephone system arranged as a link system. The well-known systems of this kind all have a so-called line-link frame consisting of two switching stages, the so-called A-stage and B-stage, also called primary and secondary stage, respectively. As a rule such a switching frame requires less switching apparatus and accordingly the primary or A-stage consists of smaller switching units, which with the same number capacity of the line-link frame requires an increase of the switching units in the secondary or B-stage. Small switching units in the A-stage of the line-link frame means small groups of links via which the group of subscribers' lines connected to such switching units can be reached. This results in the fact that the subscribers to be connected must be carefully grouped according to their traffic and that in the case of traffic fluctuations difficulties may be expected.

Previous attempts have been made to reduce these difficulties by dividing the switches in the A-stage of a line-link frame into two parts, which are each reached via an individual group of links of half the original size. The subscribers are reached via one group of primary switches according to their normal numbers, the multiple connections of the second group of primary switches being so arranged that the subscribers are reached according to their numbers, the last two digits of which have been interchanged.

This means that within a hundred or some hundred's group of subscribers, a subscriber always occurs in combination with two different or slightly different groups of subscribers, as determined by the number of positions of the switches in the A-stage and the number of numbers involved in the mixing process. The mixing obtained in this way is such that a hundred, or some hundred's group of subscribers, which without this interchanging of digits consist(s) of e. g. 10 separate groups (or 20 separate groups of 10 (or 20) subscribers, assumes a more homogeneous character.

This mixing method is primitive, because not more than two different groups can be obtained. A more comprehensive mixing can only be obtained by involving not only the last two, but all three digits in the mixing process. Relatively simple considerations already show that in this mixing method the complications become extremely great, whereas on the other hand the advantage is in certain respects only limited.

A more effective mixing method, which may involve only the last two figures of a subscriber's number, if necessary, can generally be obtained by the application of any arithmetic operation on the digits involved in the mixing process, which yields an even distribution of these digits over the relevant series of numbers.

Generally this condition is satisfied in all addition and subtraction systems in which an increasing arithmetical series of numbers having numerical values of between 1 and 0 (10) is added to or subtracted from one of the digits of the parts involved in the mixing process of systematically arranged numbers (without carryover), after which of the thus obtained digit combinations, those having modified equal digits, are united in one group.

The above mentioned and other features and objects of this invention and the manner of attaining them will become more apparent and the invention itself will be best understood by reference to the following description of embodiments of the invention taken in conjunction with the accompanying drawings, wherein.

Figure 6:
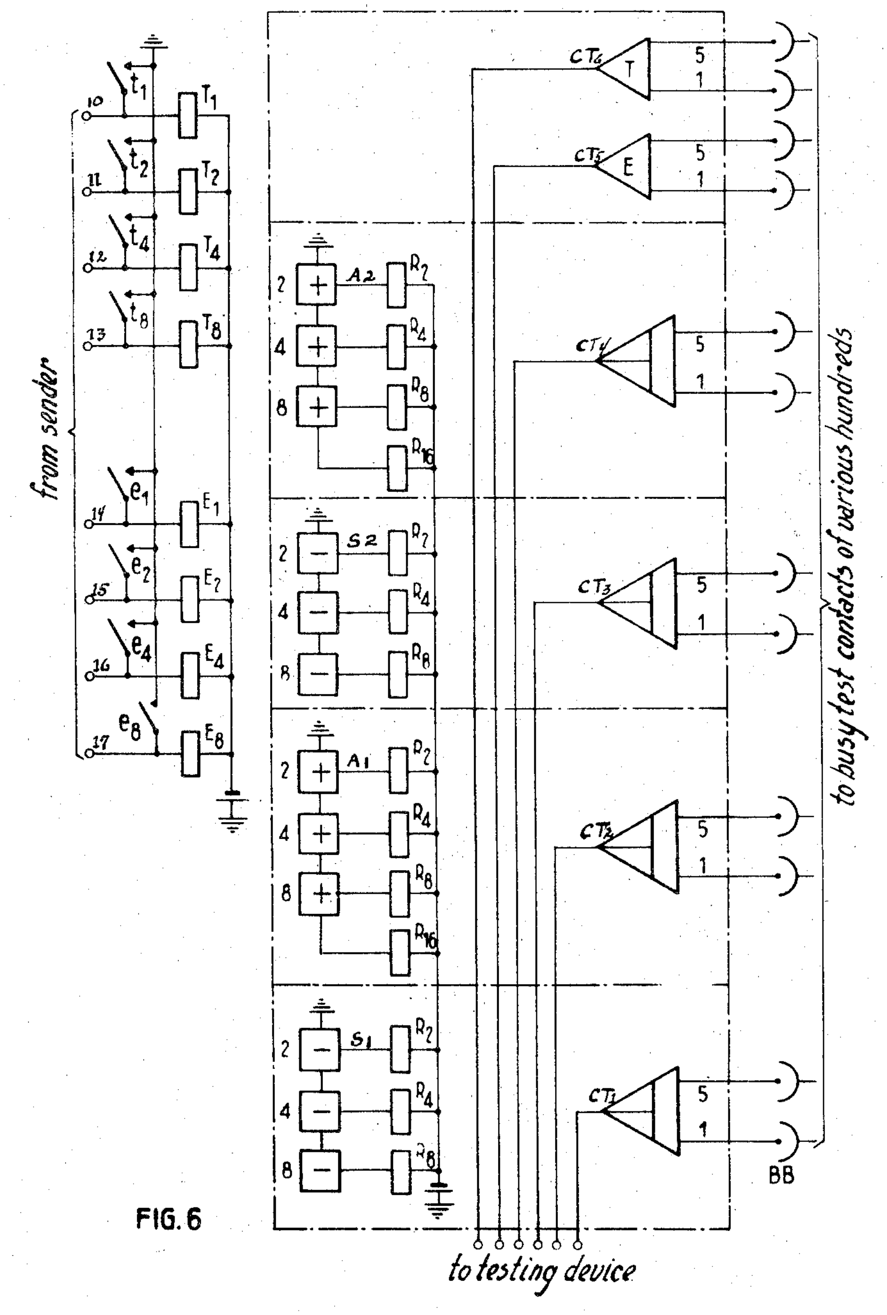
Figure 7:
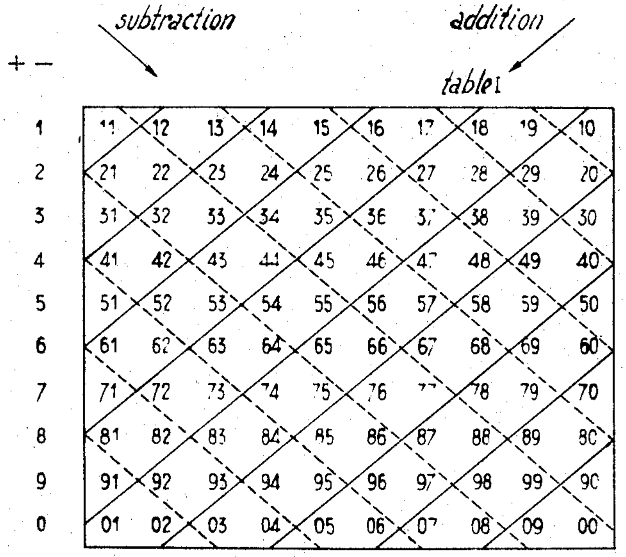
Figure 8:
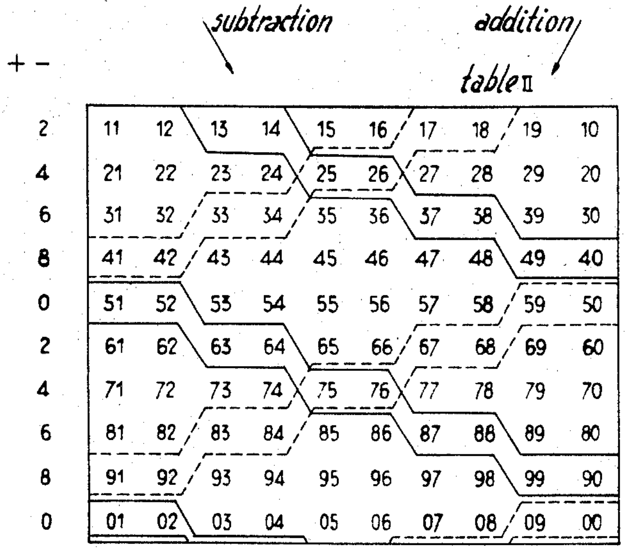

Fig. 6 shows a wiring diagram of part of a marker circuit for a line link frame adapted according to this invention and showing the register-relays $T_1$—$T_8$ and $E_1$—$E_8$ for the tenth and unit digits of the desired number adding and subtracting devices (four pieces) for addition and subtraction of said tenth and unit digit, and contact trees for the register-relays and the sum of the difference relays of the adders and subtractors providing ways between busy test contacts of the automatic switches and the testing device in the common control equipment; and Figs. 7 and 8 are tables showing by way of example how groups of twenty numbers of a hundred group can be combined in various ways using simple arithmetic methods corresponding to the arrangement of the outlet contacts of multi-contact switches.

To illustrate this mixing of the digits or contact switches of an automatic switching system according to this invention, reference is first had to Table I (Fig. 7) wherein the numbers 11 to 00, constituting a complete hundred group, are arranged in 10 columns and 10 rows of 10. If to the last digit of each of the numbers a number is added, or if a number is subtracted from it, which number is equal to the number of the relevant row, or to the first digit of the relevant number, the original numbers, arranged in rows sloping by 45 degrees (downward to the right for subtraction and downward to the left for addition, will have the same last digit after the operation. The arithmetic series is in this case the row of the natural numbers from 1 to 0 (10). Consequently, the rows shown also indicate the grouping in connection with the mixing method.

By way of example, Table II (Fig. 8) shows in this mixing method a next step consisting in the application of the arithmetic series obtained from the natural series of the numbers by duplication. The numbers exceeding 10 in the series need only to be indicated by their units digits.

As it becomes a bit more difficult to indicate all the groupings by lines in the table, only two have been indicated, viz. one for addition and one for subtraction. The others are self-evident then. It is to be observed that the series of addends and subtrahends may be made to coincide arbitrarily with the various rows or columns.

The series of addends and subtrahends may further be continued. The following series would have to be the threefold of the series of natural numbers. This is quite possible, but as will result later from the practical embodiment it is less practical than the series which is the quadruple of the original series. The quintuple gives no result. The series of numbers which represent the sextuple, septuple, octuple and nonuple of the original series given a result corresponding with that of the natural series of numbers, the double, triple and quadruple of this series, in which case addition and subtraction must be interchanged however.

Together with the mixing obtained by inverting the order of sequence of the last two digits of a subscriber's number, as indicated above, this method provides for practical purposes a sufficient number of different mixings.

If the mixing takes place with ten-point switches in the A-stage and if this stage is restricted to a one hundred group of subscribers, a subscriber always occurs in quite different groupings.

If on the contrary 20-point A-selectors are used and if the mixing is restricted to a hundred group of subscribers, the various mixing groups have always a small group of 4 subscribers in common, which is different for the various combinations.

The practical realization of the mixing methods will be explained now. To that end it is necessary first to submit the addition of two binary numbers having at the most four binary digits to a closer examination.

The addition of the first digits of the two numbers yields, as a first binary digit of the sum, a digit having a value of 1, if one of the two binary digits has a value of 1. If both the binary digits to be added amount to 1, a carryover must be effected to the adding device for the second binary digits of the numbers, no digit being recorded on the first place.

Consequently, recording of the first binary digit of the total must take place, if: the first binary digit of one number has a value of 1 and if that of the other number has a value of 0, or the reverse. This can algebraically be represented by:

$$a_0b_1+a_1b_0=r_{(1)0}$$

The expression $r_{(1)0}$ indicates that the first binary digit is recorded.

A carryover of a binary digit, to be represented by $t_{(1)0}$, to the next adding section, which has double the value of the preceding section, must be effected if the binary digits of both numbers have values of 1. This can algebraically be represented by:

$$a_0b_0=t_{(1)0}$$

In the addition of all the following digits of a number the carryovers from the former adding sections play a part. When the second digits are added e. g. a digit must be recorded if both digits of the second section have values of 0 and a digit is carried from the preceding adding section, or if there is no carryover and if only one digit ($c$) or the other ($d$) has a value of 1, or if all the three $t$, $c$ and $d$ have values of 1. This can algebraically be represented as follows:

$$r_{(2)0}=a_0b_0c_1d_1+(a_1+b_1)\ (c_0d_1+c_1d_0)+a_0b_0c_0d_0=$$
$$a_0b_0(c_0d_0+c_1d_1)+(a_1+b_1)\ (c_0d_1+c_1d_0)=$$
$$t_{(1)0}\cdot(c_0d_0+c_1d_1)+t_{(1)1}\cdot(c_0d_1+c_1d_0)$$

where $t_{(1)1}$ indicates that no carryover takes place from the first section. That no carryover takes place is symbolically indicated by $t_{(1)1}$:

$$t_{(1)1}=t_{(1)0'}=(a_0b_0)'=a_1+b_1$$

or $$=a_1b_1+a_1b_0+a_0b_1$$

in which inverse conditions are indicated by accents. A carry from the second to the third section must take place if both digits have values of 1, no carry being effected from the first section, or if all three of the relevant factors have values of 1. This can be represented by:

$$t_{(2)0}=(a_1+b_1)c_0d_0+a_0b_0c_0d_1+a_0b_0c_1d_0+a_0b_0c_0d_0$$
$$=a_0b_0(c_0+d_0)+(a_1+b_1)c_0d_0=$$
$$t_{(1)0}\cdot(c_0+d_0)+t_{(1)1}\cdot c_0d_0$$

Consequently, there is no carryover to the third section, if:

$$t_{(2)0'}=t_{(2)1}=\{t_{(1)0}\cdot(c_0+d_0)+t_{(1)1}\cdot c_0d_0\}'=$$
$$(t_{(1)1}+c_1d_1)\cdot(t_{(1)0}+c_1+d_1)=$$
$$t_{(1)0}\cdot c_1d_1+t_{(1)1}\cdot(c_1+d_1)$$

When the calculation is continued, it appears that generally an adding section having a subscript $n$ and binary digits $x$ and $y$ can be represented by the switching formulae:

$$r_{(n)0}=t_{(n-1)0}\ (x_0y_0+x_1y_1)+t_{(n-1)1}\ (x_0y_0+x_1y_0) \quad (1)$$
$$r_{(n)1}=t_{(n-1)1}\ (x_0y_0+x_1y_1)+t_{(n-1)1}\ (x_0y_1+x_1y_0) \quad (2)$$
$$t_{(n)0}=t_{(n-1)}\ (x_0+y_0)+t_{(n-1)1}\cdot x_0y_0 \quad (3)$$
$$t_{(n)1}=t_{(n-1)0}\cdot x_1y_1+t_{(n-1)1}\ (x_1y_1) \quad (4)$$

It results from these formulae that an adder can be composed of similar switching sections, which may be connected one after the other in a unlimited number and which are always connected by two wires to the preceding and by two wires to the next section, via which the carryover indication or the inverse of it are received or given.

A consideration of these formulae teaches that an undesired reaction of one carryover wire on the other is to be expected, because the coupling of one wire to the other, respectively represented by the second term of the right-hand member of Formula 3 and the first term of the right-hand member of Formula 4 constitute, together with the other terms of these formulae, a closed circuit. This becomes clearer if Formulae 3 and 4 are written as follows:

$$t_{(n)0}=t_{(n-1)0}\cdot(x_0y_0+x_1y_0+x_0y_1)+t_{(n-1)1}\cdot x_0y_0$$
$$t_{(n)1}=t_{(n-1)0}\cdot x_1y_1+t_{(n-1)1}\cdot(x_1y_1+x_1y_0+x_0y_1)$$

Terms $x_0y_0$ and $x_1y_1$, respectively, represent the undesired coupling circuits of the two carryover wires. These can be rendered harmless by further elaborating the formulae.

$$t_{(n)0}=t_{(n-1)0}\cdot(x_1y_0+x_0y_1)+x_0y_0 \quad (5)$$
$$t_{(n)1}=t_{(n-1)1}\cdot(x_1y_0+x_0y_1)+x_1y_1 \quad (6)$$

Figure 1:
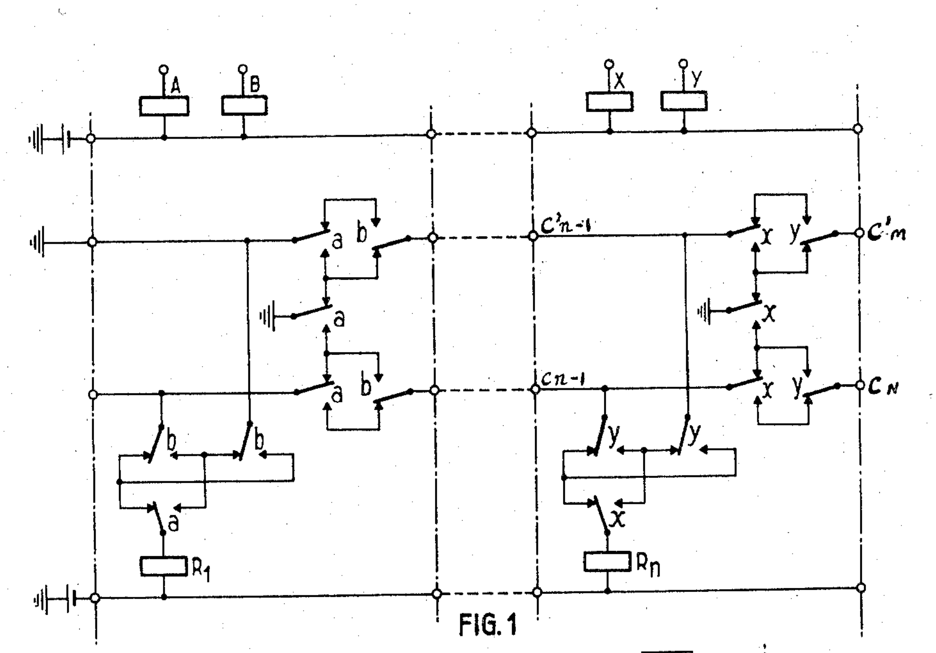
Fig. 1 shows an electrical wiring diagram of the first and end sections of a binary adder as used in the control equipment for an automatic communication system according to this invention.

In virtue of Formulae 1, 5 and 6 and adder for two binary numbers can be represented by the arrangement according to Fig. 1.

Formula 1 may also be written as follows:

$$r_{(n)0}=(t_{(n-1)0}+x_0y_1+x_1y_0)\cdot(t_{(n-1)1}+x_0y_0+x_1y_1) \quad (7)$$

If use is made of recording relays having two differentially arranged windings, the carryover $t$ influencing one winding and the terms $x_0y_1+x_1y_0$ the other, whilst analogously a differential relay is taken for the second factor of Formula 7 as well, two similarly working relays are obtained, so that with these relays the recording formula needs only be taken for one half.

$$r_{(n)0}=t_{(n-1)0}\cdot R_{n(1)}+(x_0y_1+x_1y_0)\cdot R_n(2) \quad (8)$$

The terms R denote energization of the windings.

Figure 2:
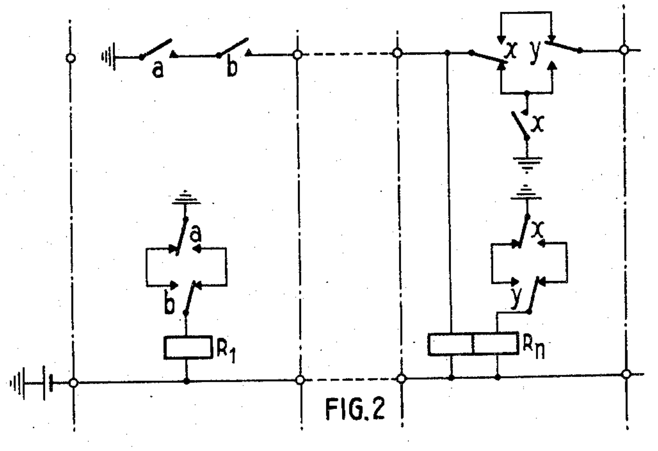
Fig. 2 shows a modification of the binary adder wiring diagram shown in Fig. 1 using differential relays in all adding sections except the first.

As in this formula there only occurs the carryover $t_{(n-1)0}$, the adder can further consist of sections connected by only one wire. Formula 4 is valid for this case. The arrangement thus obtained is represented by Fig. 2. This arrangement needs much fewer contacts than the one according to Fig. 1. Another arrangement is still possible, analgous to the one according to Fig. 2, in which in the normal condition the two windings of the relays are energized in opposite directions.

It is possible to design completely analogous subtracting devices derived from the adders by reversing some contacts. This need not be explained here.

The sections of a binary adder shown in Fig. 1 are the first and the $n$th, all sections, not shown have the same diagram. The numbers or digits to be added are given to the adder in a binary form. Relays A . . . X and so on and relay B . . . Y and so on store the numbers to be added. Contacts *a* and *b* of relays A and B perform the adding operation in the first section. This operation must, according to the Table III below (table of binary addition) result in a sum to be stored on relay $R_1$, and a carryover C and a non-carryover $C_1'$, which latter two operations are transferred from the first to the second section.

*Table III*

| A | B | $R_1$ | C | $C_1$ |
|---|---|---|---|---|
| 0 | 0 | 0 | 0 | 1 |
| 1 | 0 | 1 | 0 | 1 |
| 0 | 1 | 1 | 0 | 1 |
| 1 | 1 | 0 | 1 | 0 |

Each following section operates according to the Table IV below, in which the binary addition is shown from two bits or parts X and Y of the number to be added and a carryover $C_{n-1}$, originating from the preceding section.

*Table IV*

| $C_{n-1}$ | X | Y | $R_n$ | $C_n$ | $C'_n$ |
|---|---|---|---|---|---|
| 0 | 0 | 0 | 0 | 0 | 1 |
| 0 | 1 | 0 | 1 | 0 | 1 |
| 0 | 0 | 1 | 1 | 0 | 1 |
| 0 | 1 | 1 | 0 | 1 | 0 |
| 1 | 0 | 0 | 1 | 0 | 1 |
| 1 | 1 | 0 | 0 | 1 | 0 |
| 1 | 0 | 1 | 0 | 1 | 0 |
| 1 | 1 | 1 | 1 | 1 | 0 |

The diagram shown in Fig. 2 is a variation of that given in Fig. 1. Its operation is the same (see Tables III and IV above). The use of differential relays in all sections (except the first) results in the use of about half of the number of contacts on the relays on which the bits to be added are stored in the different sections of the adder.

Figure 3:
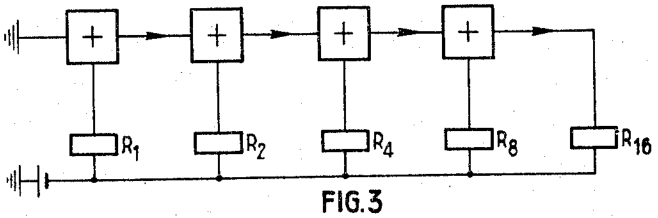
Fig. 3 shows a block-diagram of four sections of a binary adder similar to that shown in Figs. 1 or 2.

In the following an arrangement by means of which an addition or a subtraction can be performed will be represented symbolically by Fig. 3. The squares in Fig. 3, which are marked with a "+" contain a sectional diagram of an adder as shown in Fig. 1 or 2 except the sum relay R, which is shown in Fig. 3 for reasons of simplicity as a one winding relay.

Figures 4, 5:
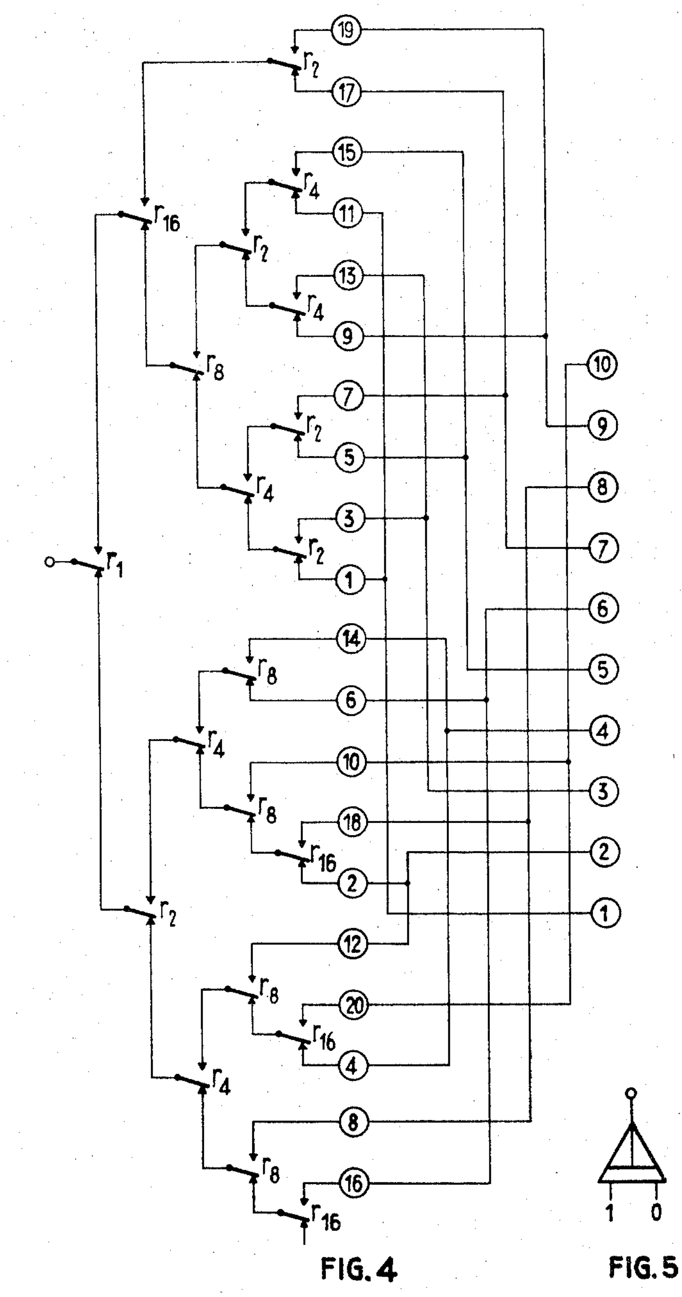
Fig. 4 shows an electrical wiring diagram of a contact-tree of contacts of relays $R_1$ up to $R_{16}$ of an adder as shown in the previous figures, which contacts are connected in such a way that the output leads 1–10 give the decimal result of the binary addition.
Fig. 5 shows the drawing symbol used for the contact tree in Fig. 4.

The tens digit of the total has to be omitted and the unit digit has to be converted into a decimal representation because it must be used to find back a certain group of links. This can be done in a well-known way by means of a contact tree having 21 outlets, of which those having value indications of 11 and higher are connected to those having value indications of 1 to 0 (10). Such a contact tree will consist of 20 change-over contacts, one for the top, the other 19 being distributed over 4 relays, as it is done by way of example in Fig. 4. The connections of 20 outlets to 10 outlets having values of 1 to 0 (10) has also been indicated in this figure. This standard circuit will symbolically be represented by Fig. 5 in the further explanation. In the case of a ten-point contact tree being connected to five outlets having values of 1 to 5, indications of 1 and 5 are placed in the symbol shown in Fig. 5, instead of 1 to 0.

A marker which must search the free links between the A- and B-switches of the line-link frame receives the whole number of the subscriber to be called and that of the calling subscriber from the register. If e. g. mixing is only applied in a hundred group of subscribers, the last two digits of both subscribers' numbers are submitted to one or more of the above-mentioned operations. If, consequently, a subscriber has e. g. 6 possible paths at his disposal, there must be provided 6 mixing patterns. The easiest possibilities consist in taking: (*a*) the normal order of sequence of the last two digits; (*b*) the inverse order of the last two digits; (*c*) four sets of paths determined by the sum or the difference of the last, or last but one, digit and the series of the natural numbers or the double of them.

Fig. 6 shows that part of a marker of a cross-bar switching system, which is necessary to locate the various possible ways via which a subscriber in a mixed 100-group can be found. The example shown in Fig. 6 relates to a cross-bar system having 20-point switches in the A- or primary stage of the subscribers line link frame. Without any departure from the original invention, this number of outlets of the switches in the A-stage of the switching system may be varied. As it is supposed in the example that a subscriber can be reached via 6 different links of the A- and B-stage (primary and secondary switches) of the subscriber line link frame, there must be provided 6×5 test links between the A-switches serving each group of hundred subscribers and the marker. These last mentioned test links are shown entering the marker (Fig. 6) at the right hand side. They are marked with "to busy contacts of various hundreds."

These thirty links are all provided with busy contacts, the condition of which must be tested in the marker of the automatic switching system. In the case of twenty-point switches and of a mixing comprising only 100 subscribers, each of the testing contact trees $CT_1$—$CT_6$ needs only to have 5 outlets for indicating the correct twenty group, in which the relevant subscriber can be reached according to each of the mixing appearances. By connecting the five times six outlets of the contact trees of Fig. 6 via switches having 30 contacts to the correct hundred group of subscribers, the busy condition of the links of this hundred group can be signalled to a marker.

The test wires between the busy contacts of the various crossbar switches in the A-stage of a subscriber's line link frame (not shown in Fig. 6) are connected to bridges of crossbar switches BB, which are shown in Fig. 6 with the symbol.

If for simplicity's sake the explanation is for a moment restricted to one marker, which can co-operate e. g. with only 2000 subscribers (this is no restriction of the system, but a simplification of the explanation of the invention) a crossbar switch, having 10 bridges possessing 20 positions each, can be used to establish the desired connection between the busy contacts of the links between the A- and B-stage of the line-link frame and the marker. The fact is that such a crossbar switch has 10×2×10 positions each having 5 contacts. Even four thousand subscribers might be directly served by such a switch.

The crossbar switch BB has to be positioned according to the thousands and hundreds digit of the desired subscriber's number. The 6×5=30 test links between each group of switches serving 100 subscribers and the marker is then selectively switched through to the 6 contact trees $CT_1$ up to $CT_6$. These contact trees, which are already described in detail in Fig. 4, connect the 6 usable test links out of the group of 30 possible test links serving the group of A-switches via which the desired subscriber can be reached, with a testing device, which can, in connection with other known apparatus, determine the A-switch via which the desired connection will be built up. This testing of links is a known technique in crossbar systems. Fig. 6 shows two groups of 4 register relays of the Marker $T_1$ up to $T_8$ and $E_1$ up to $E_8$. As soon as the marker is seized by a sender, all information temporarily stored in the sender is transferred from the sender to the marker. This information contains amongst others the complete numbers of called and calling subscribers. The drawing (Fig. 6)

shows only the register relays for storing the last two digits of one of these subscriber numbers. Normally a marker will amongst other means consist of two of the calculating circuits shown in Fig. 6. The information is e. g. transferred from the sender to the marker by means of groups of 4 wires, from which groups only two are shown, numbered 10 up to 13 and 14 up to 17. If one or more of such wires are connected to ground in the sender, the relevant relay ($T_1 \ldots T_8$, $E_1 \ldots E_8$) in the marker will operate and close via a contact ($t_1 \ldots t_8$, or $e_1 \ldots e_8$) a holding circuit. Contacts of said relays $T_1 \ldots T_8$ and $E_1 \ldots E_8$ are connected in the adding circuits $A_1$ and $A_2$, the subtracting circuits $S_1$ and $S_2$, and the contact trees T and E. The adding and subtracting circuits $A_1$, $A_2$, $S_1$ and $S_2$ are symbolically shown in Fig. 6. The actual circuits are e. g. shown in Figs. 1 and 2, so that there is no need to give here a further explanation. The ways of adding and subtracting the two digits involved has already been clarified by means of Figs. 7 and 8. The results of these adding and subtracting processes are stored on four groups of relays, named $S_1R_2$, $S_1R_4$, $$S_1R_8,\ A_1R_2 \ldots A_1R_{16},\ S_2R_2 \ldots S_2R_8,\ A_2$$

$R_2 \ldots A_2R_{16}$. By means of contacts of each of these four groups of relays a contact tree is formed along the lines described for Fig. 4. These contact trees are shown as $CT_1$ up to $CT_4$. After receiving the necessary digits from the sender, the marker performs the adding and subtracting processes on the last two digits of a subscriber number, with the result that the busy contacts of the six switches in the A- or primary stage of the subscribers line link frame via which the desired subscriber can be reached, are connected to the link testing device in the marker.

It is to be observed that if these crossbar switches are used in co-operation with groups of 2000 subscribers the number of outlets per subscriber might be increased to 10.

The description of the testing arrangement itself will not be given here. Any arrangement capable of testing the busy condition of the links between the A- and the B-switches, at the same time with the busy condition of the other groups of links provided between the outgoing and the incoming B-switches of the line-link frame, may serve.

A very important point in the described mixing of the connection of the A-switches of the line-link frame is that it automatically enables to obtain a division of the subscribers into groups which can be served by separately working control circuits, as is also described in the Oberman U. S. Patent application Serial No. 430,340, filed May 17, 1954. The control method as it is described in the said patent application has the advantage that in the case of control circuit trouble, a numerical group of subscribers is not put out of service, but that the traffic capacity of a certain group decreases. This is obtained at the cost of a more complicated and therefore more expensive multiple of the switches of the A-stage of the line-link frame. The invention described above requires such a multiple, and yields then automatically the independent setting of the various (mixing) groups, with the attendant advantage of a reduction of the number of switches required in the A-stage.

It is not necessary to use the described adding and/or subtracting devices to find the mixing paths via which a subscriber can be reached. If e. g. 20-point switches are used in the A-stage of the line-link frame and the mixing is restricted to groups of 100 subscribers, use can be made of a hundred-point selector, or a crossbar switch, which is positioned according to the last two digits of the desired subscriber's number (so in crossbar systems this can be the calling as well as the called subscriber). This switch must have as many poles as there are mixing paths between the A- and B-stage of the line-link frame via which the relevant subscriber can be reached. The selector or crossbar switch gives in this position a direct connection of the busy contacts of the relevant links with the testing device of the marker. This busy selector may be connected to the desired hundred group of subscribers via relays or similar devices having a large number of contacts (30 in the case of 6 outlets per subscriber and 20-point bridges of the switches in the desired A-stage). The converting method described above, which required an addition and/or a subtraction, is embodied in the fixed wiring of the busy test selector. It depends on the extensiveness of the desired mixing and the cost of the relay converting apparatus against that of the selector or the part of the required crossbar switch which serves as a busy test selector, which method is to be preferred as the most economic one. In all probability the relay method will deserve the preference.

In connection with the above, it is to be observed that in the case of a busy test selector by means of which the busy contacts of the mixing paths associated with a specified numerical line are connected to the central control equipment, the mixing groupings of the numerical lines connected to the A-stage of a line-link frame need not necessarily be obtained by the application of the methods described.

Any self contained good grouping may be used in co-operation with such a switch, as it only depends on the wiring via which links a specified numerical line can be reached.

While I have illustrated and described what I regard to be the preferred embodiment of my invention, nevertheless it will be understood that such is merely exemplary and that numerous modifications and rearrangements may be made therein without departing from the essence of the invention, I claim:

1. An automatic switching system having a plurality of numbered terminals any one of which may be connected to any other through a given plurality of multi-contact switches and connections by calling its corresponding number, and means for increasing the degree of freedom of connections through said switches and said connections between any calling and a called numbered terminal, said means comprising: means for storing the called number corresponding to a called terminal, separate means for converting the stored number into a corresponding number in each of a plurality of differently ordered corresponding systems of numbers, means for connecting the contacts of said switches in a multipled group in orders corresponding to each of said systems, means controlled by the storing means and said separate converting means for connecting the contacts of said switches in accordance with each regular numerical system corresponding to said called number, and means for busy testing said connected contacts corresponding to said called number for determining a free connection to said called terminal.

2. A system according to claim 1 wherein said separate means for converting said stored number comprises a calculator circuit.

3. A system according to claim 2 wherein said calculator comprises an adder.

4. A system according to claim 2 wherein said calculator comprises a subtractor.

5. A system according to claim 2 wherein said calculator comprises both an adder and a subtractor.

6. A system according to claim 2 wherein said calculator operates in the binary number system.

7. A system according to claim 1 wherein said ordered systems of numbers are divergently ordered.

8. A system according to claim 1 wherein said means for connecting said contacts comprises contact trees corresponding to each of said storing and separate converting means.

9. In an automatic telecommunication system between a plurality of subscribers having an exchange having link circuits, each link circuit comprising primary and secondary groups of multi-contact switches and connections between said switches, the improvement comprising: means for connecting the outlet contact of a group of primary switches in a predetermined non-parallel order, means for receiving signals corresponding to each said outlet contact, and means for converting said signals to other signals corresponding to connections of another said outlet contact whereby internal blocking is materially reduced in said exchange.

10. A system according to claim 9 wherein said connecting of the outlet contacts in said group of primary switches is in an irregular predetermined order.

11. A system according to claim 9 wherein said means for receiving said signals comprises registering relays.

12. A system according to claim 9 wherein said means for converting said signals comprises a calculator circuit.

13. A system according to claim 12 wherein said calculator comprises an adder.

14. A system according to claim 12 wherein said calculator comprises a subtractor.

15. A system according to claim 12 wherein said calculator comprises both an adder and a subtractor.

16. A system according to claim 12 wherein said means for converting said signal includes contact trees for setting up said connections, said trees being controlled by said calculator.

17. A system according to claim 9 wherein said means for converting said signals operates in the binary numerical system.

No references cited.